Patented Oct. 6, 1931

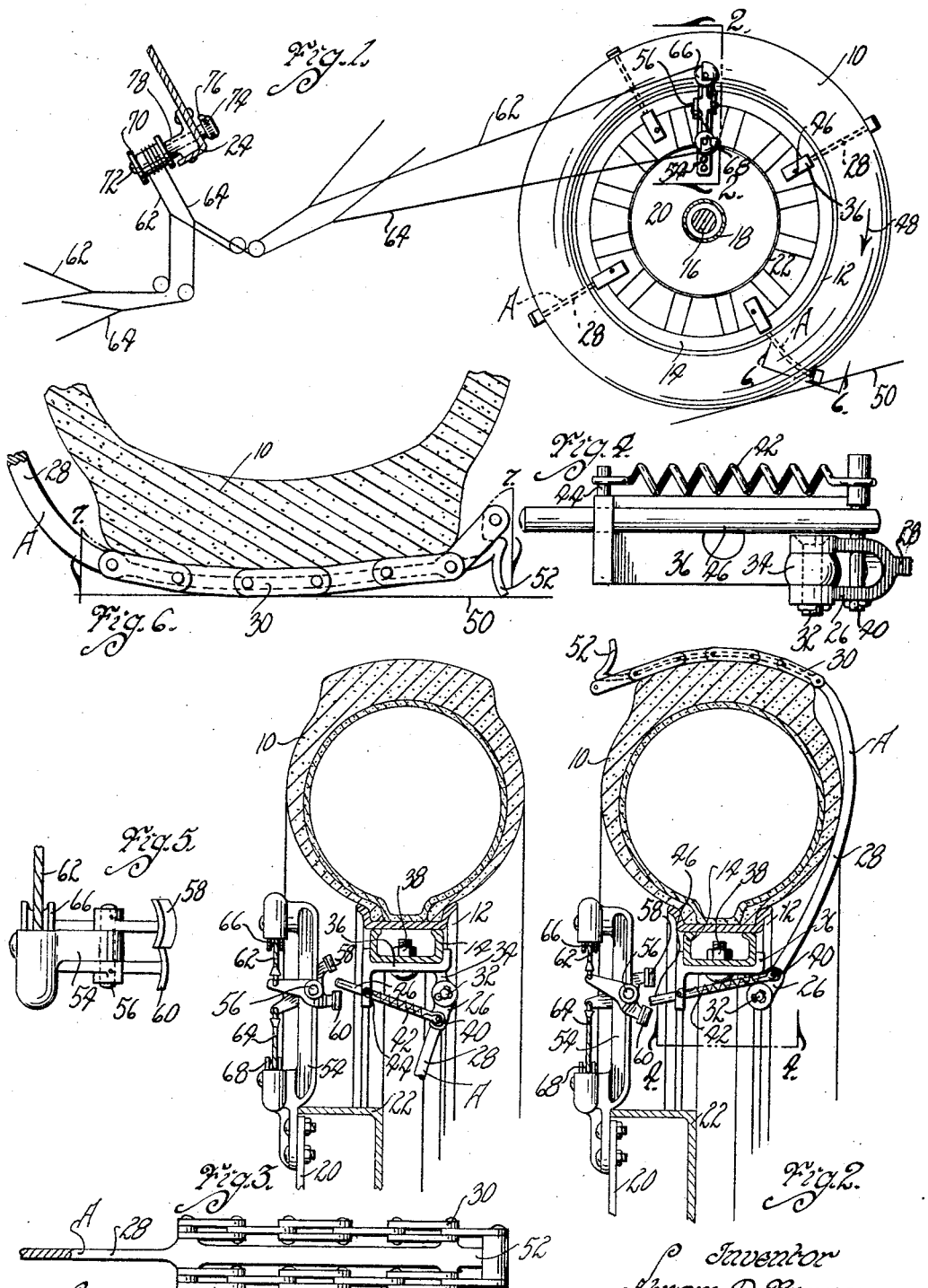

1,826,123

UNITED STATES PATENT OFFICE

ABROM D. BRUNER, OF ROCKWELL CITY, IOWA

QUICKLY APPLIED NONSKID DEVICE

Application filed July 16, 1930. Serial No. 468,356.

The object of my invention is to provide a quickly applied non-skid device which is simple, durable and comparatively inexpensive to manufacture.

A further object of my invention is to provide a quickly applied non-skid device consisting of non-skid members pivotally mounted on automobile wheels or the like and adapted to swing selectively within the outline of the tire on the wheel or to a position with members over the tread of the tire so as to act in the capacity of lugs on the tires to prevent skidding.

A further object is to provide means controllable from within a vehicle on which the tire is mounted for applying the non-skid means or moving it to inoperative position while the vehicle is in motion without the necessity of manually applying a detachable non-skid device to the tire, as when non-skid chains are used.

More particularly, it is my object to provide non-skid means consisting of non-skid members pivoted to brackets supported on the rim of the tire and movable from an inoperative position to an operative non-skid position with shoe means for engaging the non-skid member for so moving it, the shoe means being controllable from the dash of an automobile or from any other desired position within the vehicle on which the tire is mounted.

Still a further object is to provide means on the non-skid member to positively prevent it from coming unhooked from the tire when in ground engaging position.

With these and other objects in view my invention consists in the construction, arrangement and combination of the various parts of my device, whereby the objects contemplated are attained, as hereinafter more fully set forth, pointed out in my claims, and illustrated in the accompanying drawings, in which:

Figure 1 is a semi-diagrammatic view showing my non-skid members applied to a tire and my mechanism for moving the members to and from operative position.

Figure 2 is an enlarged sectional view on the line 2—2 of Figure 1 showing the non-skid member in operative position.

Figure 3 is a central sectional view showing it in non-operative position.

Figure 4 is an elevation of the bracket for mounting the non-skid member as viewed from the line 4—4 of Figure 2.

Figure 5 is a plan view of the shoe means and bracket therefor for moving the non-skid member to and from operative position.

Figure 6 is an enlarged sectional view on the line 6—6 of Figure 1 showing the non-skid member engaged with the ground and Figure 7 is a plan view of the non-skid member as viewed from the line 7—7 of Figure 6.

On the accompanying drawings, I have used the reference numeral 10 to indicate the tire of an automobile wheel. The tire 10 is mounted on a rim 12 which in turn is mounted on a felloe 14. An axle is indicated at 16, and axle housing at 18 and the stationary closure plate of a brake mechanism is indicated at 20. A brake drum is indicated at 22. The dash of the automobile is indicated at 24.

My quickly applied non-skid device includes non-skid members A, each formed of a yoke 26, resilient arm 28 and anti-skid links 30. The yoke 26 is pivoted to a pin 32. The pin 32 extends through an ear 34 of a mounting bracket 36. The bracket 36 is adapted to be secured to the felloe 14 by a bolt or the like 38. Extending through the yoke 26 is an over-center spring pin 40 which is connected by an over-center spring 42 with a pin 44 on the bracket 36. Pivotally associated with the pin 40 and slidably associated with the bracket 36 is a thrust pin 46.

As shown in Figure 2, the anti-skid member A may assume an operative position with the links 30 positioned over the tread of the tire 10 or it may assume an inoperative position as shown in Figure 3 with the arm 28 and non-skid member A within the outline of the tire. The arm 28 in this position will rest between the spokes of the wheel on which the tire 10 is mounted.

As shown adjacent the lower right side of the tire 10 in Figure 1 with the tire rotating in the direction of the arrow 48, the arm 28 will bend and the non-skid member A will engage the tread of the tire when the member comes in contact with the ground surface 50. Thus the member A will act effectively as a non-skid lug without imparting undue strain to the arm 28 and the bracket 36. As shown in Figure 6, the outermost link of the arm 28 is adapted to bend upwardly around the tread of the tire by means of a hooked end 52 of the arm 28 engaging the ground surface 50. This positively prevents any tendency for the non-skid member A to be disengaged from the tire 10 when the member is in engagement with the ground.

From the foregoing description it will be obvious that after the thrust pin 46 is quickly pushed inwardly to such a point that the spring 42 will pass over-center of the pin 32 (the momentum of the arm 28 and non-skid member A aiding in the passage of the spring over-center) that the non-skid member may be moved from an inoperative position, as shown in Figure 3, to the operative position shown in Figure 2 or vice versa. In order to engage the thrust pin 46 and thus move the non-skid member to the desired position, I provide the following described mechanism.

Mounted in the closure plate 20 or any other stationary part of the vehicle adjacent the tire 10 is a bracket 54. A shaft 56 is journalled in the bracket 54 and an "on" shoe 58 and an "off" shoe 60 are secured to the shaft 56. As shown in Figure 2, the shaft 56 is in "on" position. The shoe 58 has engaged the thrust pin 46 and moved it to a position where during the next following revolution of the tire 10 it will pass between the shoes 58 and 60 and the non-skid member A will remain in operative or applied position. When the shaft 56 is moved to an "off" position as shown in Figure 3, however, the shoe 60 will engage the thrust pin 46 and during the next revolution of the tire, the thrust pin will then be again put in a position between the two shoes 58 and 60. For moving the "on" and "off" shoes 58 and 60 from within the vehicle, any desired means may be provided such as cables 62 and 64 extending over pulleys 66 and 68 and wound on a drum 70. The drum 70 is secured to a shaft 72 having a control knob 74 and a pointer 76. The shaft is journalled in a bracket or the like 78 which may be attached to the dash 24 of an automobile or any other suitable supporting surface. It will be obvious that pulling on the cable 62 but rotating the drum 70 in one direction will loosen the cable 64 and vice versa.

The cables 62 and 64 may be branched as illustrated diagrammatically in Figure 1 to extend to all four wheels of the automobile.

My construction provides a non-skid applying means easily and quickly operable from within the vehicle without the necessity of having to manually apply non-skid chains or the like.

Some changes may be made in the construction and arrangement of the parts of my device without departing from the real spirit and purpose of my invention, and it is my intention to cover by my claims, any modified forms of structure or use of mechanical equivalents which may be reasonably included within their scope.

I claim as my invention:

1. In a quickly applied non-skid device, a non-skid member pivoted to swing selectively within the outline of a tire or over the tread of the tire, a thrust pin operatively associated with said non-skid member and means independent of said thrust pin and having a cam surface for engaging said thrust pin during its rotation with said tire and thereby causing said member to swing to either of such positions.

2. In a quickly applied non-skid device, a non-skid member pivoted to swing selectively within the outline of a tire or over the tread of the tire, over-center spring means to retain said non-skid member in either of said positions and means for causing said member to swing to either of such positions.

3. In a quickly applied non-skid device, a non-skid member pivoted to swing selectively within the outline of a tire or over the tread of the tire, a thrust pin operatively associated with said member, shoe means having inclined surfaces to engage said thrust pin to cause such swinging movement and means for moving said shoe means to operative and inoperative positions.

4. In a quickly applied non-skid device, a non-skid member pivoted to swing selectively within the outline of a tire or over the tread of the tire, over-center spring means to retain said member in either position and shoe means having an inclined surface operatively engageable with said non-skid member to move the same from the second mentioned position to the first mentioned position thereof.

5. In a quickly applied non-skid device, a non-skid member pivoted to swing selectively within the outline of a tire or over the tread of the tire, means having an inclined surface operatively engageable with said non-skid member to move the same from the second mentioned position to the first mentioned position thereof during rotation of the non-skid device and a second means having an inclined surface operatively engageable with said non-skid member to move the same from the first mentioned position to the second mentioned position thereof during rotation of the non-skid device.

6. In a quickly applied non-skid device, a non-skid member pivoted to swing selectively within the outline of a tire or over the tread of the tire and shoe means having surfaces inclined relative to the plane of rotation of the tire and operatively engageable with said non-skid member to move the same to either position desired as the non-skid member rotates.

7. In a quickly applied non-skid device, a non-skid member pivoted to swing selectively within the outline of a tire or over the tread of the tire, shoe means having inclined surfaces operatively engageable with said non-skid member to move the same upon rotation thereof with said tire to either position desired and means, controllable from within a vehicle on which the tire is mounted, for moving the shoe means.

8. In a quickly applied non-skid device, a non-skid member pivoted to swing selectively within the outline of a tire or over the tread of the tire, a pair of shoe means operatively engageable with said non-skid member to move the same to either position desired and means, controllable from within a vehicle on which the tire is mounted, for moving each of the shoe means, comprising a drum within said vehicle and a cable connection between the drum and each shoe means for moving said pair of shoe means in opposite directions when the drum is moved.

9. In a quickly applied non-skid device, a non-skid member pivoted to swing selectively within the outline of a tire or over the tread of the tire, shoe means operatively engageable with said non-skid member to move the same to either position desired and over-center spring means to maintain the non-skid member in either position.

Des Moines, Iowa, July 2, 1930.

ABROM D. BRUNER.